(12) United States Patent
Wiens et al.

(10) Patent No.: US 8,676,462 B2
(45) Date of Patent: Mar. 18, 2014

(54) ELECTRONIC BRAKE SYSTEM HAVING A FRICTION BRAKE COMPRISING FRICTION LININGS FOR AT LEAST ONE WHEEL BRAKE, AND HAVING AT LEAST ONE ELECTRONIC CONTROL DEVICE

(75) Inventors: Eduard Wiens, Edelsberg (DE);
Rüdiger Puff, Hünstetten-Wallbach (DE); Oleg Bauer, Gießen (DE)

(73) Assignee: Contintental Teves AG & Co. oHG (DE)

( * ) Notice: Subject to any disclaimer, the term of this patent is extended or adjusted under 35 U.S.C. 154(b) by 95 days.

(21) Appl. No.: 13/378,195

(22) PCT Filed: Jun. 18, 2010

(86) PCT No.: PCT/EP2010/058646
§ 371 (c)(1),
(2), (4) Date: Feb. 6, 2012

(87) PCT Pub. No.: WO2010/149592
PCT Pub. Date: Dec. 29, 2010

(65) Prior Publication Data
US 2012/0130614 A1    May 24, 2012

(30) Foreign Application Priority Data

Jun. 23, 2009  (DE) .......................... 10 2009 027 122
Feb. 8, 2010  (DE) .......................... 10 2010 001 676

(51) Int. Cl.
| | | |
|---|---|---|
| *G06F 17/00* | (2006.01) | |
| *F16D 66/00* | (2006.01) | |
| *B60T 17/22* | (2006.01) | |
| *F16D 66/02* | (2006.01) | |

(52) U.S. Cl.
USPC ...................... 701/70; 188/111 E; 188/1.11 R

(58) Field of Classification Search
USPC ............. 701/70; 303/191; 188/1.11 E, 1.11 R
See application file for complete search history.

(56) References Cited

U.S. PATENT DOCUMENTS 5,570,937 A * 11/1996 Wolfsried ..................... 303/191
6,409,289 B2 * 6/2002 Wagner et al. ................ 303/191
(Continued)

FOREIGN PATENT DOCUMENTS

| DE | 102 28 115 | 1/2004 |
| DE | 103 38 564 | 3/2005 |

(Continued)

OTHER PUBLICATIONS

International Search Report corresponding to Application No. PCT/EP2010/058646, dated Oct. 15, 2010.

*Primary Examiner* — Khoi Tran
*Assistant Examiner* — Robert Nguyen
(74) *Attorney, Agent, or Firm* — RatnerPrestia

(57) ABSTRACT

The invention relates to a device and an operating method for an electronically controlled braking system having a friction brake, including friction linings for at least one wheel brake and having at least one electronic control device ESP+EPB–ECU. The aim of the invention is to provide an improved seat grinding device and an improved seat grinding process. The aim is achieved by proposing that an automated, electronically controlled or regulated routine is provided for seat grinding the friction partners of the friction brake, such that the automated seat grinding routine is fully executed after a release, particularly after entering a release code or after electronically connecting an interface of the electronic control device ESP+ESC–ECU of the braking system to a separate control device EST, and the results data of the seat grinding routine are stored in a memory area of the electronic control device ESP+ESC–ECU.

17 Claims, 3 Drawing Sheets

(56) References Cited

U.S. PATENT DOCUMENTS

| | | | |
|---|---|---|---|
| 7,320,506 B2* | 1/2008 | Fagergren et al. | 303/191 |
| 8,249,791 B2* | 8/2012 | Baumgartner et al. | 701/80 |
| 2003/0052532 A1* | 3/2003 | Costello et al. | 303/7 |
| 2004/0130211 A1 | 7/2004 | Fagergren et al. | |
| 2006/0273658 A1* | 12/2006 | Halassy-Wimmer et al. | 303/191 |
| 2009/0043472 A1 | 2/2009 | Bentner et al. | |
| 2009/0227423 A1 | 9/2009 | Bentner et al. | |
| 2010/0292889 A1* | 11/2010 | Cahill et al. | 701/31 |

FOREIGN PATENT DOCUMENTS

| | | |
|---|---|---|
| DE | 10 2006 013 509 | 9/2007 |
| DE | 10 2007 037 616 | 2/2009 |
| WO | WO 2004/101338 | 11/2004 |

* cited by examiner

ELECTRONIC BRAKE SYSTEM HAVING A FRICTION BRAKE COMPRISING FRICTION LININGS FOR AT LEAST ONE WHEEL BRAKE, AND HAVING AT LEAST ONE ELECTRONIC CONTROL DEVICE

CROSS REFERENCE TO RELATED APPLICATIONS

This application is the U.S. National Phase Application of PCT International Application Number PCT/EP2010/058646, filed Jun. 18, 2010, which claims priority to German Patent Application No. 10 2009 027 122.8, filed Jun. 23, 2009, and German Patent Application No. 10 2010 001 676.4, filed Feb. 8, 2010, the contents of such applications being incorporated by reference herein.

FIELD OF THE INVENTION

The invention relates to an electronic brake system having friction linings and to an associated operating method for an electronic brake system, in particular an externally actuable parking brake system including an electronic brake system having a friction brake comprising friction linings for at least one wheel brake, and having at least one electronic control device (ECU), wherein by at least one integrated electronic means (ESP+EPB-ECU) for automated activation, in particular for bedding in friction partners of the friction brake.

BACKGROUND OF THE INVENTION

Electronic brake systems are as a matter of principle known. Friction brakes are used with brake linings which act on a friction ring of a brake disk or a friction face of a brake drum. The friction lining is mounted on a carrier such as, for example, on a carrier plate or on a brake shoe. For various reasons, a factory-new friction lining can be provided with a coat or a coating. For example, the coating can serve to improve the external appearance of the friction lining or else of the carrier plate with respect to visible surfaces, for example in the installed state within a wheel brake. A technical reason for a coat in a drum brake can be considered that of at least temporarily avoiding undesired corrosion processes between the actual friction face of the friction lining and a friction face of the metallic brake drum or brake disk. A technical disadvantage of the coating or coat can result from the fact that the friction properties of the friction lining are affected. Quite independently of the coat or coating, a friction pairing does not achieve its complete friction effect until after a number of actuations of the brake. The reason for this is that settling and leveling processes of the involved friction partners have to take place, in the context of which the friction partners become adjusted to one another in terms of their carrying behavior. As a function of the driving behavior and brake activation behavior, such a bedding in process can extend over a relatively long time period in the usual brake operating mode of a motor vehicle. This braking process usually requires a particularly careful driving style after a change of the friction lining, and in this context, for example, emergency braking should be avoided initially in order to avoid punctiform vitrification of the friction lining. On the other hand, a service performed at a specialist workshop may include carrying out this bedding in process by carrying out a test run with test braking operations and checking on a brake test bench before the vehicle is handed over to the customer.

A disadvantage of known procedures is that the bedding in process is to a certain extent carried out individually, and therefore not in a reproducible fashion. As a result of this, it may as a matter of principle be the case that a bedding in process is not carried out sufficiently or not with the necessary care. It is as a matter of principle also conceivable that the bedding in process incorrectly fails to occur at all.

SUMMARY OF THE INVENTION

An aim of the present invention is to ensure a satisfactory bedding in process and to make it possible to reproduce the braking behavior of factory-new motor vehicles or that of motor vehicles whose friction linings have been replaced in a specialist workshop.

This is achieved for a device of the generic type and for a method of the generic type together with an electronic brake system having a friction brake comprising friction linings for at least one wheel brake, and having at least one electronic control device (ECU), wherein by at least one integrated electronic means (ESP+EPB–ECU) for automated activation, in particular for bedding in friction partners of the friction brake. A core aspect of the invention is at least one integrated electronic means for automated bedding in of friction partners of the friction brake. A core idea of a corresponding operating method is, in particular, that an automated, electronically open-loop controlled or electronically closed-loop controlled routine for bedding in friction partners of the friction brake is provided, in that the automated bedding in routine is protected in that the routine is processed completely after an enable, in particular after an input of an enable code, or after electronic connection of an interface of the brake system with a separate control device, and in that result data of the bedding in routine are stored in a storage area of the control device. An advantage of the present invention is that an added value function is made possible which can be implemented, in particular by software, on the basis of indispensable components of an electronic brake system in the vehicle.

BRIEF DESCRIPTION OF THE DRAWINGS

The invention is best understood from the following description when read in connection with the accompanying drawings. Included in the drawings is the following figures.

DETAILED DESCRIPTION OF THE PREFERRED EMBODIMENTS

Figure 4:
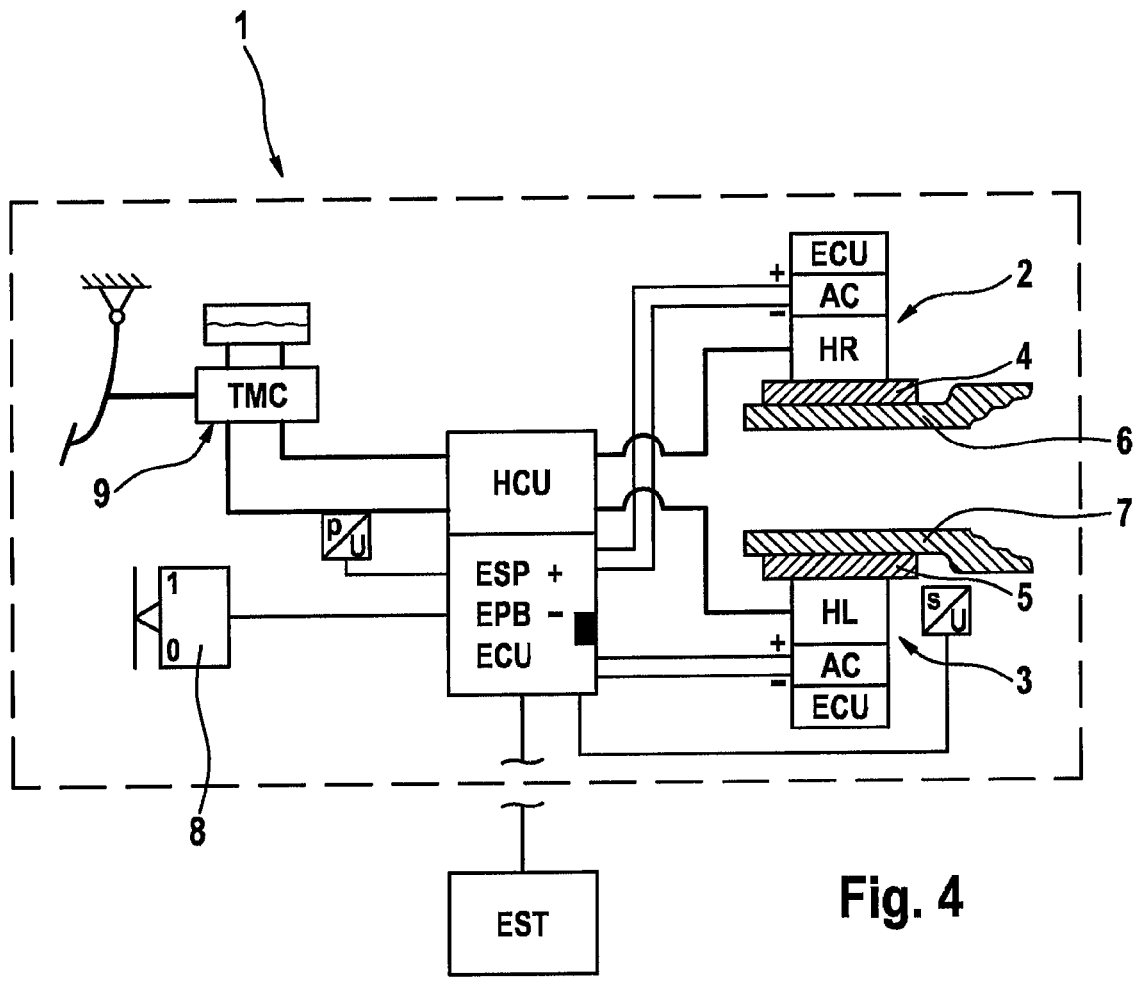
FIG. 4 is a schematic and exemplary view of a rear axle brake circuit of an electronically controlled motor vehicle brake system comprising an integrated electromechanical parking brake system EPB.

An electronically controlled motor vehicle brake system 1 having hydraulic wheel brakes 2,3 of the friction type, which as a matter of principle have friction linings 4,5 and associated friction faces in the region of friction rings 6,7 or brake drums, also has an electric actuation means 8 for a driver of a vehicle such as, in particular, a switch or pushbutton key for an electromechanical actuator system AC of the wheel brakes 2,3 as well as a hydraulic brake actuation unit 9 such as, for example, a master cylinder brake booster unit. Furthermore, means are provided for external actuation, including means for generating energy such as, in particular, a motor pump unit HCU which is driven by electric motor and in particular also performs ESP driving stability functions, and for this purpose has an electronic control unit ESP-ECU with an electronic open-loop and closed-loop control program for the brake system 1. This is, in particular, an integrated brake system which connects both a hydraulic wheel brake actuator system and an electromechanical wheel brake actuator system to one another. In this context, the electromechanical actuator system AC serves, in particular, to carry out, in particular, external actuation functions within an integrated electromechanical parking brake system EPB. Although FIG. 4 exhibits a wheel-specific actuator system AC in this context, the electromechanical actuator AC can in principle be embodied as an electromechanical Bowden cable device (EPB_CP), as a hydraulically and electromechanically actuable brake caliper (EPB_CI) which can be actuated in combination and which has the electromechanical actuator, or as what are referred to as electromechanically actuable Duo-Servo drum brakes (DSe) extending as far as purely electromechanically actuable brake calipers (EMB), and the illustrative clarification can therefore be understood symbolically.

The electronic control of such a electromechanically actuable parking brake EPB is preferably carried out by means of an integrated electronic control unit of the driving stability system ESP+EPB-ECU by providing an integrated EPB control device. Alternatively it is conceivable that the EPB parking brake system has a separately provided electronic control unit, in which case it is also conceivable that the electromechanical actuator or actuators has/have the electronic control unit or components of the electronic control unit. As a matter of principle, the electromechanical parking brake systems EPB are operated with a predefined minimum brake application force of, for example, approximately 17 kN so that a motor vehicle can be securely parked and this parking process also corresponds to legally prescribed requirements or minimum standards.

Although the invention can in principle be applied for all externally actuable electronic brake systems, said invention is suitable, in particular, for the brake systems with an electromechanical parking brake EPB, in order to permit a bedding in routine for new friction linings 4,5. In this context, the invention proposes that the brake system 1 has at least one integrated electronic means for automatically bedding in friction partners of the friction brake. The bedding in process is accordingly performed, controlled and monitored in an electronically automated fashion on the basis of a brake system 1 which is mounted in a complete form on the vehicle, and faulty or forgotten bedding in routines are therefore eliminated. It is therefore possible to carry out the bedding in routine in a standardized reproducible fashion, with the result that an added value functionality is achieved. This improves the product quality.

It is as a matter of principle assumed that the bedding in routine is carried out while the respective vehicle wheel with the friction partners (friction lining 4,5, friction rings 6,7) to be bedded in is rotated at a constant speed by virtue of a test run or by virtue of an external drive such as, for example, by means of a brake test bench at a vehicle manufacturer or at a specialist workshop. In this context, it may be necessary, in particular, that the activation of the bedding in routine certain safety functions or operating functions of the electromechanical parking brake EPB which ensure the driving stability in the normal driving mode are at least temporarily deactivated. This may include, in particular, an ESP driving stability function which as a matter of principle prevents activation of an electromechanical rear axle parking brake if a specific vehicle reference speed vref, or a specific wheel speed vRad of the wheels of a rear axle, is exceeded, in order to prevent skidding processes.

In a further refinement of the invention there is provision that the bedding in routine is implemented as a separate process in an electronic brake actuation strategy and is stored by software in the associated electronic unit such as, in particular, the ESP+EPB-ECU. In this context, the bedding in routine can measure or determine, in an at least semi-automated fashion, parameters such as, in particular, the manner of actuating the brake and/or a wheel speed during the bedding in routine and/or a wheel torque during the bedding in routine, perform open-loop and/or closed-loop control of the parameter or parameters, in particular vary said parameter or parameters, and/or coordinate variation of a plurality of parameters simultaneously and in a reproducible fashion. An essential point is that an electronic brake system 1 which is mounted completely on the motor vehicle is provided within the scope of the method according to aspects of the invention as an independent device for carrying out an electronically open-loop or closed-loop controlled bedding in routine, with the result that a bedding in process and a separate device outside the motor vehicle can as a matter of principle be dispensed with. It is therefore possible according to aspects of the invention to economize in terms of expenditure elsewhere. In this context, the control device ESP+EPB-ECU predefines, during the bedding in routine, at least one direct or indirect bedding in parameter, such as, in particular, a brake application force, a friction torque, a combination of all parameters or, if appropriate, of even their modified profile as a function of the time, which emerges in particular in an exemplary fashion from FIGS. 2 and 3.

A bedding in routine according to aspects of the invention can as a matter of principle also include the possibility of providing automatic monitoring of a time period tBedding of the bedding in routine, wherein the specific time period t can be predefined and adapted in order to permit flexible adaptation to different application situations, such as, in particular, to different types of friction brake.

A particular man/machine interface or the actuation means 8,9 which are present anyway can be provided and serve to activate the automatic bedding in routine. In one preferred embodiment, the activation of the bedding in routine is provided in a protected or encoded fashion in order to avoid misuse. For the purpose of enabling, identification may be necessary, which can be made possible, for example, by additional networking of the electronic control device ESP+EPB-ECU with an additional external control device (master computer, host, service terminal) of an automobile manufacturer or of a specialist workshop, as well as by means of a handshake based on an exchange of certified protocol data.

It is possible to provide that the electronic control device ESP+ESC-ECU has a reserved, addressed storage area which is reserved for the electromechanical actuator AC, and wherein data, specifically, in particular, result data from the bedding in routine are stored in the memory area. Furthermore, a visual display device is possible, wherein the control device ESP+EPB-ECU has an interface with the display device such that a positive or negative conclusion of a bedding in routine which has been carried out can be displayed visually. Likewise, it is, in principle, possible to display visually when a bedding in routine has entirely failed to occur. However, it is possible to implement that a bedding in process is carried out automatically at certain times, such as, for example, when the electromechanical actuator AC is first commissioned, in order to additionally improve the product quality and product reliability of the brake system 1.

It goes without saying that the bedding in routine can be carried out with open-loop or closed-loop control, and that this requires measurement data which are fed to the control device ESP+ESC-ECU. For this purpose, the control device ESP+ESC-ECU is connected electrically to sensors and/or measuring circuits such as, in particular, to at least one current sensor, and/or to at least one travel sensor, and/or to at least one wheel speed sensor s/u, and/or to at least one force sensor or at least one pressure sensor p/u. Accordingly, the operating states of the wheel brakes 2,3 and/or of the electromechanical actuators AC can be detected and processed further for the bedding in routine.

Figure 1:
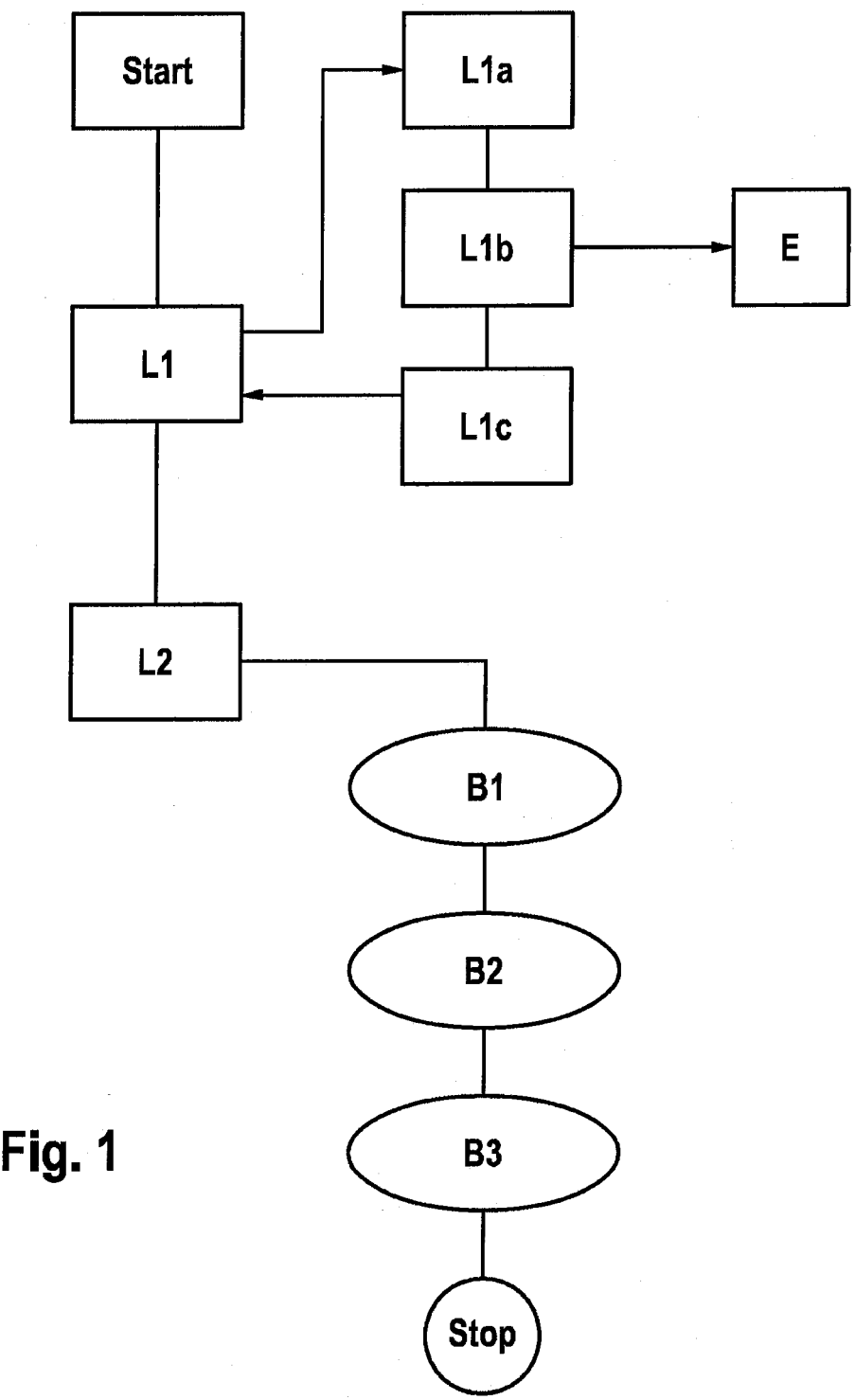
FIG. 1 shows method steps in a schematic form.
Figure 2:
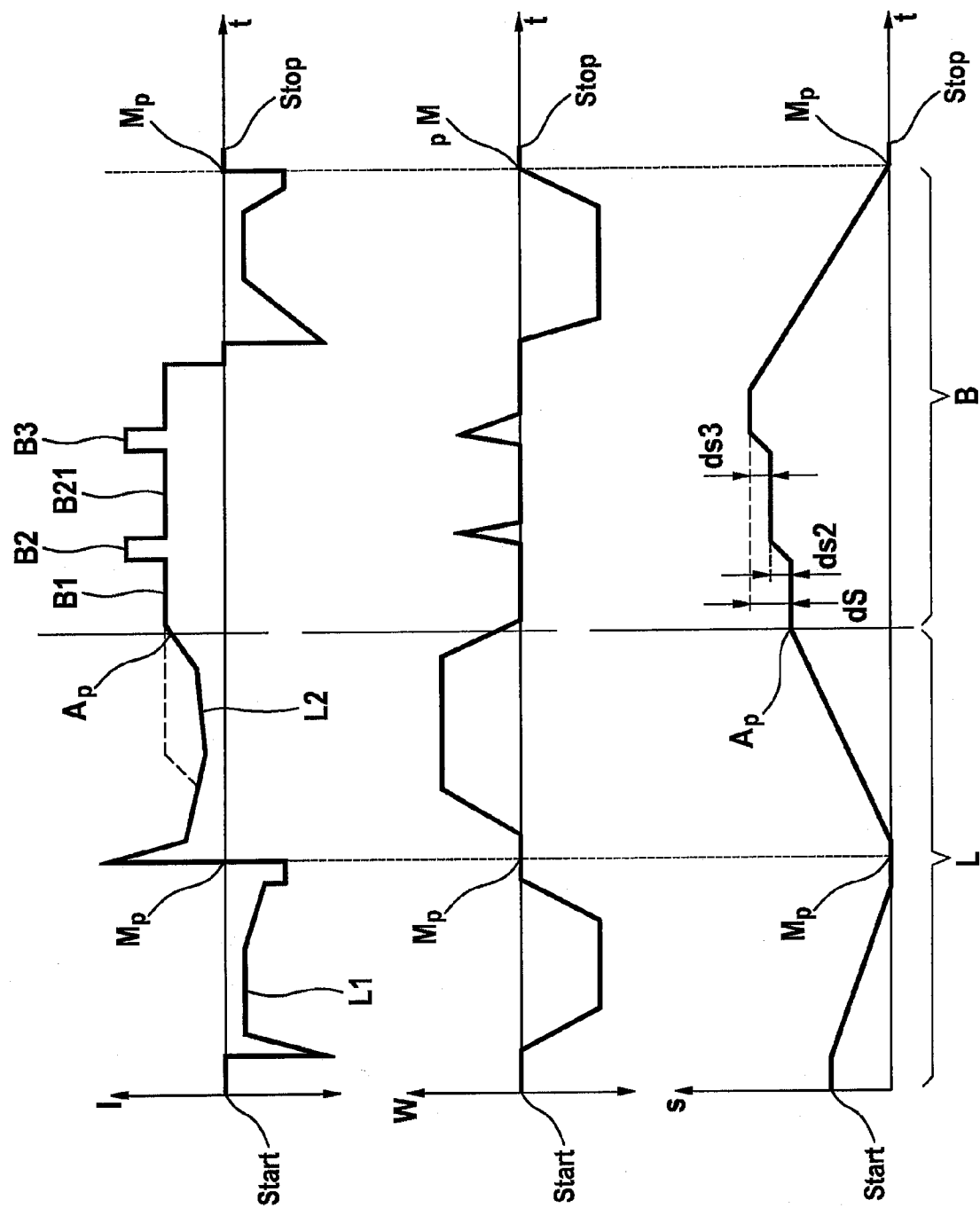
FIG. 2 shows current profiles (I), speed profiles (W) and travel profiles (s) plotted over time (t)
Figure 3:
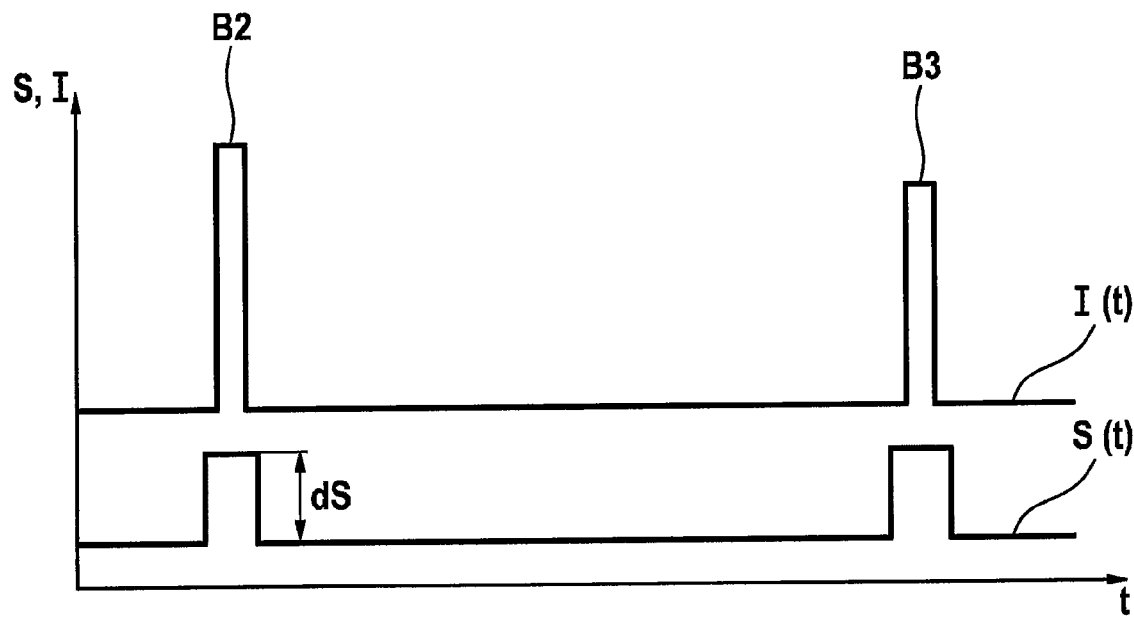
FIG. 3 shows a detail of a current/time profile plotted over time (t) from FIG. 2.

As is apparent, in particular, from FIG. 2, a bedding in method according to aspects of the invention has a plurality of phases which can be differentiated. After the start, a learning phase L(L1,L2,L1a,L1b,L1c) occurs for detecting a rear stop Mp (Mp=mounting position) of the actuator. Mp is detected by the release actuation of the actuator and is, if appropriate, newly learnt and, if appropriate, stored. Subsequently, a brake application motion is carried out and an engagement point (Ap) of the involved friction partners is detected automatically by the control device ESP+ESC-ECU, in particular, by detection of a current demand of the electromechanically driven actuator AC which has risen in a jump-like or ramp-like fashion, or by the actuator AC blocking, and, if appropriate, this engagement point (Ap) is learnt and, if appropriate, stored. This is followed by a bedding in phase B(B1,B21,B2,B3) during which the friction partners are successively bedded in. In this context, subsequent to a phase B1,B21 with a substantially constant current at least one engagement (FIG. 2, B2,B3) of the friction partners which is preferably amplified in a pulse-like fashion is performed by renewed actuation, which is manifest in the increased travel increment dS2, dS3. It is possible to increase and decrease the brake application force in a multiply repeated fashion in the manner of a pulse during the bedding in phase, in order additionally to intensify the bedding in process in a metered fashion. A bedding in routine which has taken place and which has also been successfully concluded or a bedding in routine which has not been successfully concluded can be indicated visually by a display device. In principle, the same applies to a bedding in process which has not been successful or to one which has failed to occur, which can be clarified as fault E.

As a conclusion of the bedding in phase B, the actuator according to FIG. 2 is moved again automatically to the rear stop Mp and the method is ended (Stop).

Irrespective of a change of friction lining or of initial commissioning of a brake system 1 in a new vehicle, the reproducible bedding in of friction linings according to aspects of the invention can in principle also be applied automatically if, for example, an actuated (locked) electromechanical parking brake system EPB has not been released over a relatively long time period, and the control device ESP+ESC-ECU receives a command to release the parking brake system. This measure makes it possible in a quite selective fashion and according to requirements to remove corrosion products from the friction contact faces without producing unnecessary wear of the friction linings 4,5.

The invention also extends, in particular, to a separate control device EST which is intended, for example, for a specialist workshop and which is provided for connection to the electronic control device ESC+EPB-ECU, and can serve, in particular, for the activation of the bedding in routine by authorized personnel.

LIST OF REFERENCE SYMBOLS

1 Brake system
2,3 Wheel brake
4,5 Friction lining
6,7 Friction ring
8 Actuation means
9 Actuation unit
AC Electromechanical actuator
EPB+ESC-ECU Control device
p/u Pressure sensor
s/u Travel or rotational speed sensor
HCU Hydraulic unit
EST Control device
TMC Master brake cylinder
Mp Stop
Ap Engagement point
t Time
s Travel
I Current
dS,dS1,dS2 Travel increment
L1,L1a,L1b,L1c,L2 Learning phase
B1,B2,B21,B3 Bedding in phase

The invention claimed is:

1. An electronic brake system having a friction brake comprising:
   friction linings for at least one wheel brake;
   at least one electronic control device (ECU); and
   at least one automated activation integrated electronic means (ESP+EPB-ECU) for performing a bedding in routine for bedding in friction partners of the friction brake,
   wherein the bedding in routine has a plurality of phases, specifically a learning phase for detecting a first engagement point (Mp) of the friction partners, and a chronologically adjoining bedding in phase for bedding in the friction partners, wherein the first engagement point (Mp) of the friction partners is detected or learned automatically by the automated activation integrated electronic means by measuring a rise in current, increased in a ramp-like fashion, of an electromechanically driven actuator (AC) or by blocking the actuator (AC), and wherein a brake application force which is increased in a pulse-like fashion is provided during the subsequent bedding in phase.

2. The electronic brake system of claim 1, wherein the brake system has a separate, electronically controlled bedding in routine, and the bedding in routine detects bedding in parameters including at least one of a brake application force, a wheel speed, and a wheel torque, in an at least partially automated fashion during the bedding in routine.

3. The electronic brake system of claim 1, wherein a brake system which is mounted completely on the motor vehicle is provided as a device for an electronically open-loop or closed-loop controlled bedding in routine, and wherein the bedding in routine predefines at least one indirectly or directly predefined bedding in parameter selected from the group consisting of a brake application force, a predefined friction torque, and a profile of bedding in parameters (I,W,S), as a function of the time (t).

4. The electronic brake system of claim 2, wherein automatic monitoring of a time period (t) of the bedding in routine is provided, and wherein the time period (t) can be predefined.

5. The electronic brake system of claim 1, further comprising actuation means for activating the bedding in routine.

6. The electronic brake system of claim 1, wherein the control device (ESP+ESC-ECU) has a storage area, and wherein result data from the bedding in routine are stored in the storage area.

7. The electronic brake system of claim 1, wherein the control device (ESP+ESC-ECU) has a display device or an interface with a display device, and a result of a bedding in routine can be displayed visually.

8. The electronic brake system of claim 1, wherein the brake system has at least one electrically externally actuable actuator (AC) for generating an electronically controlled brake application force.

9. The electronic brake system of claim 8, wherein the at least one electrically externally actuable actuator (AC) is an electrically actuated pump for a hydraulic wheel brake, or an electromechanical actuator (AC) selected from the group consisting of a combined electromechanically actuable wheel brake, an electromechanical Bowden cable device, an electromechanically actuable Duo-Servo wheel brake, and an externally actuable brake booster.

10. The electronic brake system of claim 8, wherein the control device (ESP+ESC–ECU) is electrically connected to sensors and/or measuring circuits selected from the group consisting of at least one current sensor, at least one travel sensor, at least one wheel rotation sensor (s/u), at least one force sensor and at least one pressure sensor (p/u), in order to detect operating states of the wheel brake and/or of the electromechanical actuator (AC).

11. The electronic brake system of claim 5, further comprising an electronic control device (EST) for connection to the automated activation integrated electronic means (ESP+EPB–ECU), wherein the electronic control device (EST) has the actuation means for activating the bedding in routine.

12. An operating method for operating an electronic brake system as claimed in claim 1, comprising the steps of:
performing an automated, electronically open-loop controlled or electronically closed-loop controlled routine for bedding in friction partners of the friction brake with the automated activation integrated electronic means (ESP+EPB–ECU), wherein the automated bedding in routine is started and processed automatically after an input of an enable code, or after electronic connection of an interface of the electronic means (ESP+ESC–ECU) of the brake system to a separate control device (EST), and
storing result data of the bedding in routine in a storage area of the electronic means (ESP+ESC–ECU).

13. The operating method of claim 12, wherein the bedding in routine is provided as a separate component of a method for activating an electromechanical actuator (AC), which method is stored in the control device (ESP+ESC–ECU) of the brake system.

14. The operating method automated activation integrated electronic means of claim 12, further comprising the steps of:
carrying out measuring processes during the bedding in routine,
passing measurement data of the measuring processes on to the automated activation integrated electronic means (ESP+ESC–ECU), and
electronically processing the measurement data with the automated activation integrated electronic means (ESP+ESC–ECU).

15. The operating method of claim 12, wherein the brake application force is repeatedly increased and decreased in a pulse-like fashion during the bedding in phase (B1,B2,B3).

16. The operating method of claim 12, wherein a successfully concluded bedding in routine or a bedding in routine which is not successfully concluded is reported.

17. The operating method of claim 12, wherein following activation of the bedding in routine, at least one operating function of the brake system, which contributes during the driving mode to ensuring driving stability, is deactivated automatically, and the operating function is automatically reactivated when the bedding in routine is concluded.

* * * * *

UNITED STATES PATENT AND TRADEMARK OFFICE
CERTIFICATE OF CORRECTION

PATENT NO.        : 8,676,462 B2                                         Page 1 of 1
APPLICATION NO. : 13/378195
DATED             : March 18, 2014
INVENTOR(S)       : Wiens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 137 days.

Signed and Sealed this

Twenty-ninth Day of September, 2015

Michelle K. Lee
*Director of the United States Patent and Trademark Office*